(12) United States Patent
Van Horn et al.

(10) Patent No.: US 8,556,176 B2
(45) Date of Patent: Oct. 15, 2013

(54) METHOD OF AND APPARATUS FOR MANAGING AND REDEEMING BAR-CODED COUPONS DISPLAYED FROM THE LIGHT EMITTING DISPLAY SURFACES OF INFORMATION DISPLAY DEVICES

(75) Inventors: Erik Van Horn, Ocean View, NJ (US); Daniel James Olson, Voorhees, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 11 days.

(21) Appl. No.: 13/245,376

(22) Filed: Sep. 26, 2011

(65) Prior Publication Data
US 2013/0075464 A1 Mar. 28, 2013

(51) Int. Cl.
*G06K 7/10* (2006.01)
(52) U.S. Cl.
USPC ..................... 235/454; 235/462.01
(58) Field of Classification Search
USPC ................. 235/454, 462.01–462.49
See application file for complete search history.

(56) References Cited

U.S. PATENT DOCUMENTS

| | | | |
|---|---|---|---|
| 5,340,971 A | 8/1994 | Rockstein et al. | |
| 6,619,549 B2 | 9/2003 | Zhu et al. | |
| 6,685,093 B2 | 2/2004 | Challa et al. | |
| 6,736,322 B2 | 5/2004 | Gobburu et al. | |
| 6,877,665 B2 | 4/2005 | Challa et al. | |
| 7,028,906 B2 | 4/2006 | Challa et al. | |
| 7,128,266 B2 | 10/2006 | Zhu et al. | |
| 7,374,106 B1 | 5/2008 | Bromer | |
| 7,395,961 B2 | 7/2008 | Challa et al. | |
| 7,857,225 B2 | 12/2010 | Challa et al. | |
| 7,967,211 B2 | 6/2011 | Challa et al. | |
| 8,172,142 B2 | 5/2012 | Gobburu et al. | |
| 2002/0070278 A1* | 6/2002 | Hung et al. | 235/472.01 |
| 2002/0121552 A1 | 9/2002 | Kim | |
| 2003/0057284 A1 | 3/2003 | Challa et al. | |
| 2003/0230630 A1 | 12/2003 | Whipple et al. | |
| 2003/0233276 A1* | 12/2003 | Pearlman et al. | 705/14 |

(Continued)

FOREIGN PATENT DOCUMENTS

| | | |
|---|---|---|
| AT | 524785 T | 9/2011 |
| EP | 1 376 419 A1 | 1/2004 |

(Continued)

OTHER PUBLICATIONS

European Search Report of counterpart Application No. EP 12 18 5116 mailed Feb. 5, 2013, 4 pages.

*Primary Examiner* — Christle Marshall
(74) *Attorney, Agent, or Firm* — Summa, Additon & Ashe, P.A.

(57) ABSTRACT

Improved methods of and apparatus for managing and redeeming bar-coded coupons that are displayed from a light emitting display surface of an information storage and display device, such as a cell-phone, a smart-phone, or a data communication device. The linear (1D) bar code symbols, associated with bar-coded store coupons, are displayed on the light emitting display surface using in a pulse code modulation (PCM) format, wherein a substantial portion of the pixels on the light emitting display surface are energized and de-energized to emit red-wavelengths of light energy, at a rate which temporally corresponds to the spatial frequency of the bars and spaces of the linear bar code symbol, so that a laser scanning bar code symbol reading device is capable of reading the PCM formatted bar code symbol displayed from the light emitting display surface.

19 Claims, 13 Drawing Sheets

(56) References Cited

U.S. PATENT DOCUMENTS

| | | |
|---|---|---|
| 2004/0020988 A1 | 2/2004 | Omori |
| 2004/0140361 A1* | 7/2004 | Paul et al. ............... 235/462.45 |
| 2004/0232241 A1 | 11/2004 | Challa et al. |
| 2005/0103846 A1 | 5/2005 | Zhu et al. |
| 2006/0180664 A1 | 8/2006 | Barrett et al. |
| 2006/0202035 A1 | 9/2006 | Challa et al. |
| 2008/0035734 A1 | 2/2008 | Challa et al. |
| 2008/0128505 A1 | 6/2008 | Challa et al. |
| 2008/0314985 A1 | 12/2008 | Kotlarsky et al. |
| 2009/0194591 A1 | 8/2009 | Gubburu et al. |
| 2010/0145789 A1 | 6/2010 | Upadhya et al. |
| 2010/0257254 A1 | 10/2010 | Bhatnagar et al. |
| 2011/0210170 A1 | 9/2011 | Arguello |
| 2011/0215162 A1 | 9/2011 | Challa et al. |
| 2012/0187184 A1 | 7/2012 | Challa et al. |

FOREIGN PATENT DOCUMENTS

| | | |
|---|---|---|
| EP | 1 442 416 A2 | 8/2004 |
| EP | 1 442 416 A4 | 1/2007 |
| EP | 1 442 416 B1 | 9/2011 |
| EP | 2414985 A2 | 2/2012 |
| ES | 2373544 T3 | 2/2012 |
| GB | 2 478 712 A | 9/2011 |
| WO | 2012012468 A1 | 1/2012 |

* cited by examiner

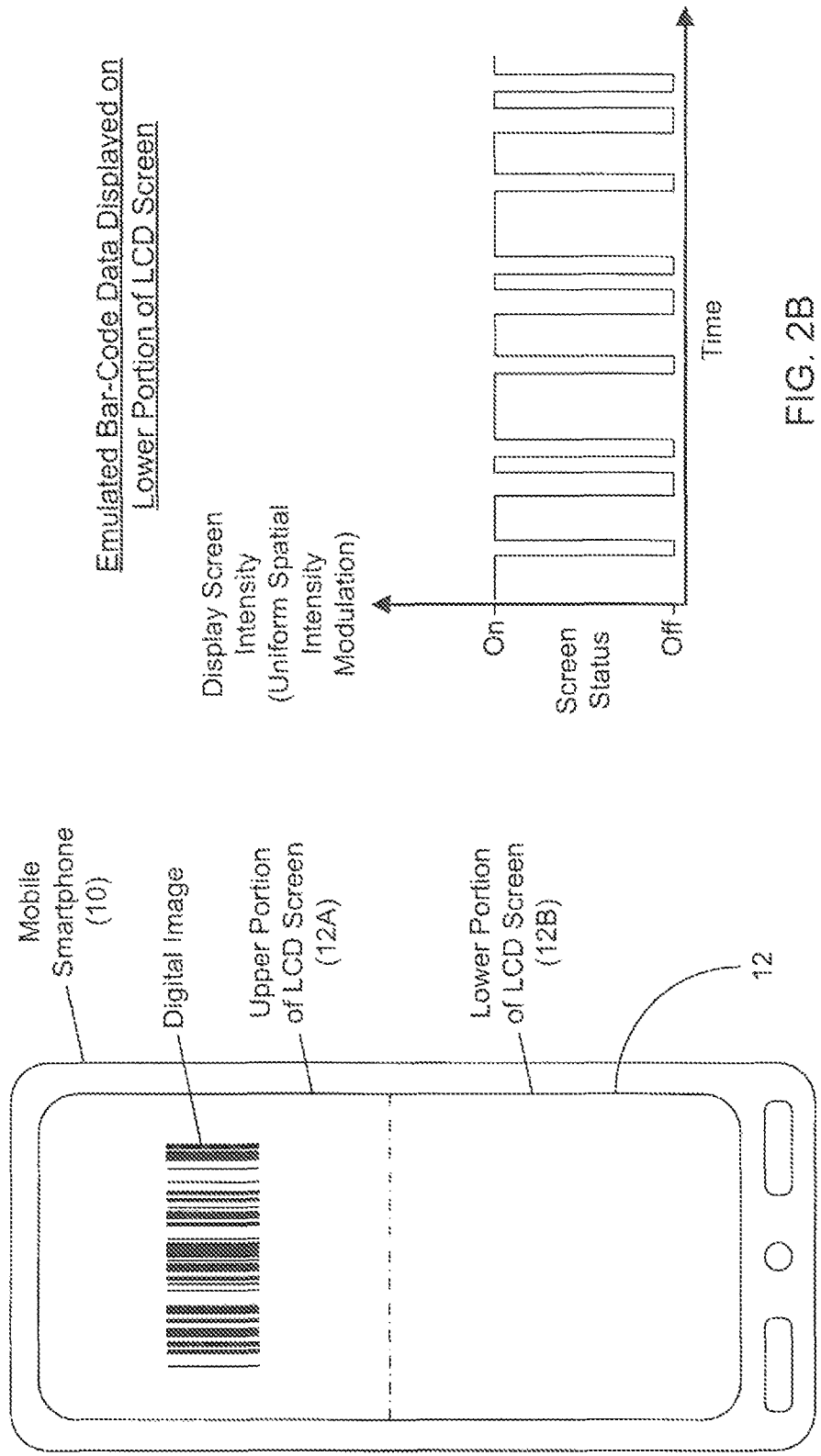

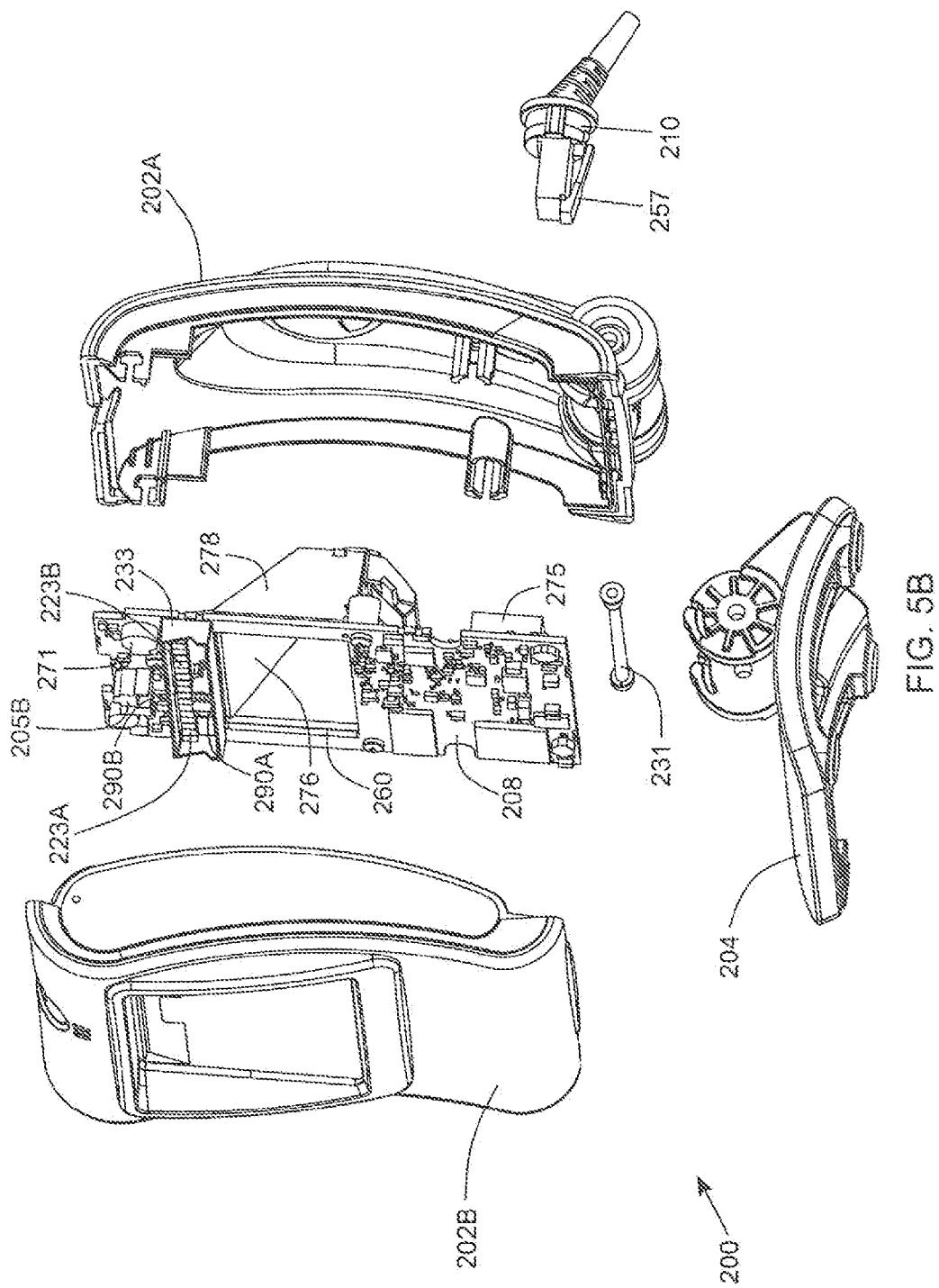

METHOD OF AND APPARATUS FOR MANAGING AND REDEEMING BAR-CODED COUPONS DISPLAYED FROM THE LIGHT EMITTING DISPLAY SURFACES OF INFORMATION DISPLAY DEVICES

BACKGROUND OF DISCLOSURE

1. Field of Disclosure

The present disclosure relates to an improved way of and means for collecting bar-coded coupons both online and offline, and redeeming the same in physical streams of commerce using imaging-based or laser scanning based bar code reading operations at retail point of sale (POS) stations.

2. Brief Description of the State of Knowledge in the Art

Bar-coded store coupons are becoming increasingly popular with consumers seeking to save money on retail purchases at physical retail point of sale (POS) stations. Today, product manufacturers and retailers publish bar-coded coupons in both online and physical streams of commerce. Typically bar-coded coupons have expiration dates, before which the coupons must be redeemed for cost savings at the time of purchase.

Currently, coupons can be redeemed by reading a printed copy of the bar-coded coupon using a laser scanning or imaging-based bar code symbol reader connected to a retail host system. Alternatively, bar-coded coupons can be displayed on the light emitting screens of cell-phones and smart phones (e.g. Apple® iPhone, Motorola® Android phones, etc) and other mobile devices with integrated digital cameras (e.g. Apple® iPod device), and then read by imaging-based bar code symbol reading systems such as Honeywell's Genesis® POS-based digital-imaging bar code symbol reader.

However, bar-coded coupons digitally displayed on mobile phones and other devices cannot be read using the millions of conventional laser-scanning bar code symbol readers currently deployed around the world, pushing such scanning devices to the brink of obsolescence.

To allow laser scanners U.S. Pat. Nos. 6,685,093, 6,877,665, 7,028,906, and 7,395,961 to Challa et al disclose systems, methods and apparatus for communicating information encoded in a bar code format between a mobile communications device (e.g. cell-phone) and a bar code symbol scanner. In one embodiment, the backlight of an LCD screen produces pulses of light that simulate the light reflected from the bar code symbol during laser scanning operations, for detection by the photo-detector within the bar code symbol scanner. In another embodiment, an LED-based IR light transmitter produces pulses of light that simulate the light reflected from the bar code symbol during laser scanning operations, for detection by the photo-detector within the bar code symbol scanner. Currently, this technology is being commercialized under the MOBEAM brand by MOBEAM, Inc., to allow users to use their mobile phones to redeem coupons at the POS checkout.

However, while the technology disclosed in Challa et al's US Patents enable mobile phones to beam bar code information to bar code scanners without the occurrence of physical scanning operations, conventional laser-based bar code symbol readers and digital-imaging bar code readers are not optimized for deployment in diverse modern retail POS environments, where there is a need for mobile phone users to beam coupons to the POS station during coupon redemption operations, in a flexible manner.

Thus, there a great need in the art for a new and improved way of and means for managing and redeeming bar-coded coupons displayed on the light emitting screens of portable devices, such as cell-phones and smart-phones, while avoiding the shortcomings and drawbacks of prior art apparatus and methodologies.

SUMMARY AND OBJECTS OF DISCLOSURE

Accordingly, it is a primary object of the present disclosure to provide a new and improved way of and means for managing and redeeming bar-coded coupons displayed from the light emitting display surfaces (e.g. screens) of portable information storage and display devices such as cell-phones, smart-phones and other mobile information and communication devices, while avoiding the shortcomings and drawbacks of prior art apparatus and methodologies.

Another object is to provide a novel method of displaying a bar code symbol on a light emitting display surface, and reading the same using a laser scanning bar code symbol reader adapted for reading the displayed bar code symbol structure.

Another object is to provide a novel and improved cell-phone, smart-phone or other portable device that is capable of displaying a 1D bar code symbol on a light emitting display surface, in a pulse code modulation (PCM) format, wherein a substantial portion of the pixels on the light emitting display surface are energized and de-energized to emit red-wavelengths of light energy, at a rate which temporally corresponds to the spatial frequency of the bars and spaces of the 1D bar code symbol, so that a laser scanning bar code symbol reading device is capable of reading the PCM formatted bar code symbol displayed from the light emitting display surface.

Another object is to provide a new type of bar code symbol display format for use when reading bar-coded store coupons using a laser scanning bar code symbol reader.

Another object of the present invention is to provide an improved smart-phone or cell-phone running an application for collecting, managing and displaying digital images of bar-coded store coupons, for use in coupon redemption operations at the POS stations of corresponding retail stores.

Another object is to provide a novel and improved cell-phone, smart-phone or other portable device that is capable of displaying a (2D) bar code symbol as a string of (1D) codes on a light emitting display surface, in a pulse code modulation (PCM) format, wherein a substantial portion of the pixels on the light emitting display surface are energized and de-energized to emit red-wavelengths of light energy, at a rate which temporally corresponds to the spatial frequency of the bars and spaces of the linear bar code symbol, so that a laser scanning bar code symbol reading device is capable of reading the PCM formatted bar code symbol displayed from the light emitting display surface.

Another object is to provide a method of reading a bar code symbol displayed on a light emitting display surface, and reading the displayed bar code symbol using a laser scanning bar code symbol reader.

Another object is to provide an improved method of displaying digital images of bar-coded store coupons from the light emitting display surfaces of smart-phones or cell-phones, for reading by either laser scanning bar code symbol readers, or digital imaging based bar code symbol readers, during coupon redemption operations at the POS stations of retail stores.

Another object is to provide an improved method of displaying digital images of bar-coded store coupons from the light emitting display surfaces of smart-phones, cell-phones and other information display devices, for reading by laser scanning bar code symbol readers during coupon redemption operations at the POS stations of retail stores.

Another object is to provide an improved method of and system for collecting, managing and redeeming bar-coded store coupons at the POS stations in retail stores.

Another object is to provide a novel and improved laser-scanning bar code symbol reader capable of reading a laser scanned bar code symbol during its normal code reading mode of operation, and a pulse code modulation (PCM) based code signal, representative of a bar code symbol and produced from a light emitting display surface, during its PCM-based coupon reading mode of operation.

Another object is to provide such a laser-scanning bar code symbol reader, wherein its normal code symbol reading mode and its PCM-based coupon reading mode automatically toggle between these modes during normal operation.

Another object is to provide a novel and improved digital-imaging bar code symbol reader capable of reading a graphically-displayed bar code symbol during its normal code reading mode of operation, and a pulse code modulation (PCM) based code signal, representative of a bar code symbol and produced from a light emitting display surface, during its PCM-based coupon reading mode of operation.

Another object is to provide such a digital-imaging bar code symbol reader, wherein its normal code symbol reading mode and its PCM-based coupon reading mode automatically toggle between these modes during normal operation.

These and other objects will become more apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein:

FIG. 1A is a schematic representation of the bar-coded coupon collection, management and redemption system of the present disclosure, wherein bar-coded coupons located online or in physical commerce can be collected using a computer (i.e. software-based) application running on a smart-phone device, cell-phone, mobile device or the like;

FIG. 2A is a schematic representation of a smart-phone device running the bar-coded coupon collection, management and redemption application of the present disclosure, and displaying a digital image of a bar-coded store coupon in its Normal Coupon Display Mode on the upper portion of the light emitting screen, while the power portion of light emitting screen displays the coupons in its PCM-formatted display mode emitting pulses of red light in a PCM format according to the structure of the bar-coded coupon;

FIG. 2B is a schematic representation of the light intensity characteristics of the light emitting display surface of the smart-phone device of FIG. 2A, wherein a digital image of the bar-coded store coupon, collected by the application of the present disclosure, is displayed on the light emitting screen during its PCM-Based Coupon Display Mode, to permit reading by the laser scanning bar code symbol reader shown in FIG. 6A through 7B;

FIG. 5B is a first perspective exploded view of the digital imaging system of the illustrative embodiment of FIG. 5A, showing its PC board assembly arranged between the front and rear portions of the system housing, with the hinged base being pivotally connected to the rear portion of the system housing by way of an axle structure;

DETAILED DESCRIPTION OF THE ILLUSTRATIVE EMBODIMENTS OF THE PRESENT DISCLOSURE

Figure 1A:
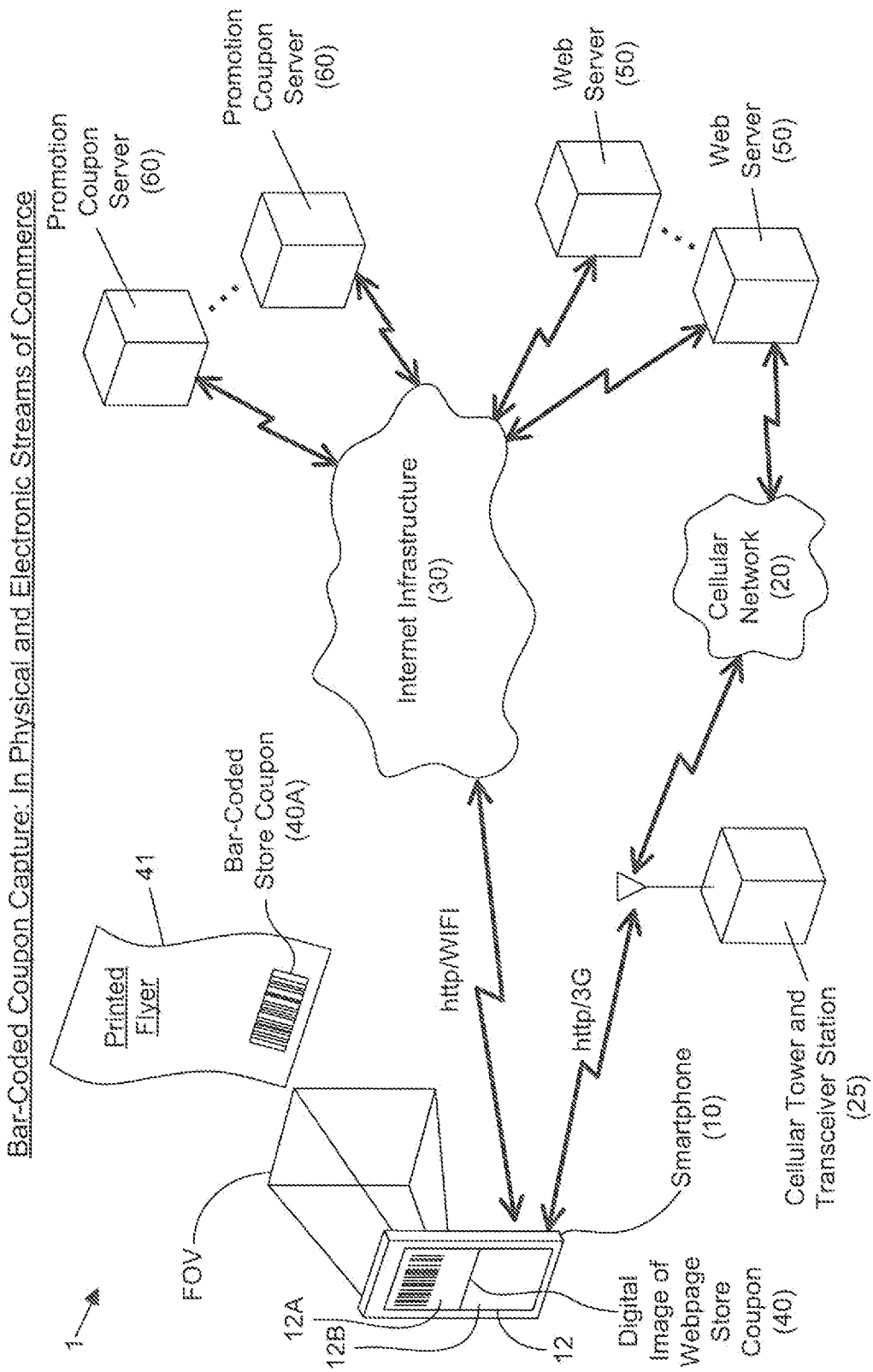

Referring to the figures in the accompanying Drawings, the illustrative embodiment of the digital imaging system will be described in greater detail, wherein like elements will be indicated using like reference numerals.

Referring now to FIG. 1, an illustrative embodiment of the coupon collection, management and redemption system 1 will be described in detail.

As shown in FIG. 1, the system 1 comprises: a plurality of web-enabled mobile information storage and display devices 10, such as Web-enabled smart-phones (e.g. Apple® iPhone), cell-phone devices, and personal mobile information devices (e.g. Apple iPod) 10 having an integrated digital camera 11, a light emitting display surface 12, and at least one bar code reading application program and API 13, and is adapted for communication with a cellular communication network 20 having cellular towers and transceiver stations 25, and also communication with the infrastructure of the Internet 36, and capable of running at least one application 13 for collecting, managing and redeeming bar-coded store coupons 40A found online as well on printed flyers and articles 41 in streams of physical commerce, using processes specified in FIGS. 2, 3 and 4; a plurality of web servers 50 operably connected to the infrastructure of the Internet, for serving to such Web-enabled smart-phones 10, web (HTML-encoded) pages that are associated with retail stores, lifestyle sites, search engines, social networks, and other web-based properties, and containing bar-coded store coupons 40B embedded therein; and a plurality of promotion coupon servers 60 for serving bar-coded store coupons 40B, described above, and located at URLs on web pages that are served from the plurality of web servers 60, for users to download and collect and organize within the application 13 loaded on their Web-enabled mobile smart-phones 10, as specified in the flow charts of FIGS. 2, 3 and 4.

Typically, each portable information storage and display device 10 comprises: a hand-supportable housing; a digital camera 11A integrated within housing; a computing platform 11B disposed in the housing and supporting an operating system (OS) for running one or more computer applications 13; light emitting display surface 12, interfaced with the computing platform, and supported by the housing, for displaying digital images generated by the applications 13, including graphics, bar code symbols, and multi-color patterns etc.; audio transducer 11D for producing sounds in response to operation of the applications; an audio microphone 11E for transducing sounds (e.g. voice signals) into corresponding electrical signals and digital packets; and wireless communication module 11C, with corresponding electro-magnetic antennas, supporting wireless communication (including transmission and reception of digital packets and voice signals) between the device 10 and digital information networks (i.e. Internet) 30, and cellular communication over cellular and/or satellite communication networks 20, illustrated in FIG. 1A.

It is understood that the light emitting display surface 12 can be implemented using many different types of electronic display technology including emitting display technology selected from, but not limited to, the group consisting of, for example, liquid crystal display (LCD) technology, light emitting diode (LED) technology, organic light emitting diode (OLED) technology, plasma display technology, and digital light projection (DLP) technology.

Figure 1B:
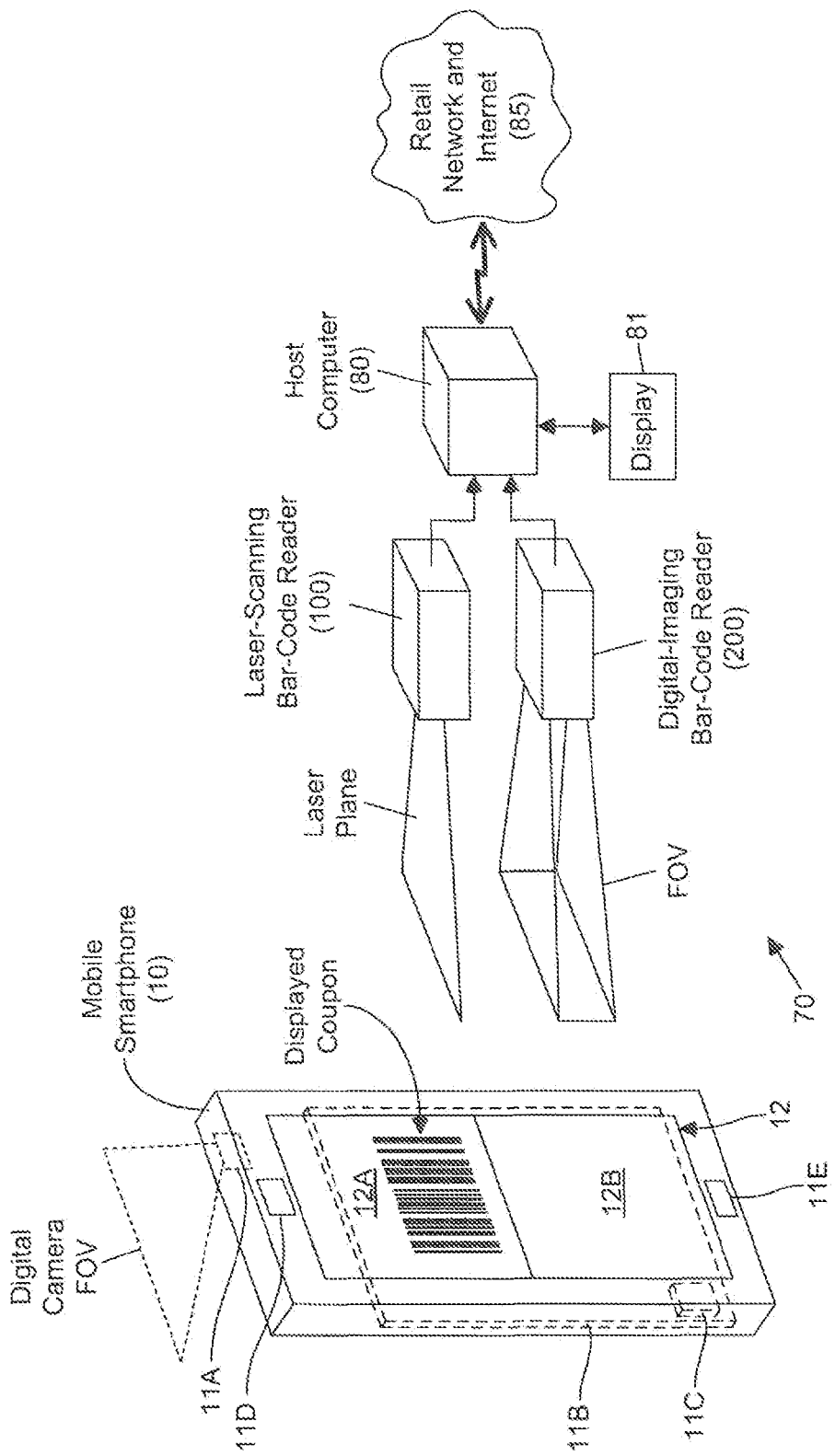
FIG. 1B is a schematic representation of a laser scanning bar code symbol reader and a digital imaging bar code symbol reader connected to a host computer system at a retail POS station, for use in reading a bar-encoded coupon displayed on the light emitting screen of a smart-phone device running the coupon collection, management and redemption application of the present disclosure.

As shown in FIG. 1B, a Web-enabled mobile smart-phone device 10 is presented by a consumer at a retail POS station 70 supporting a host system 80 and display 81 on the retail network 85 operably connected to the Internet. Also shown in FIG. 1B, a laser scanning bar code symbol reader 100 and digital imaging bar code symbol reader 200 are interfaced with the host computer system (e.g. cash register system), and capable of reading bar-coded store coupons displayed from the light emitting display surface of the Web-enabled smart-phone device 10 when operating in different modes of coupon display operation.

Figure 5A:
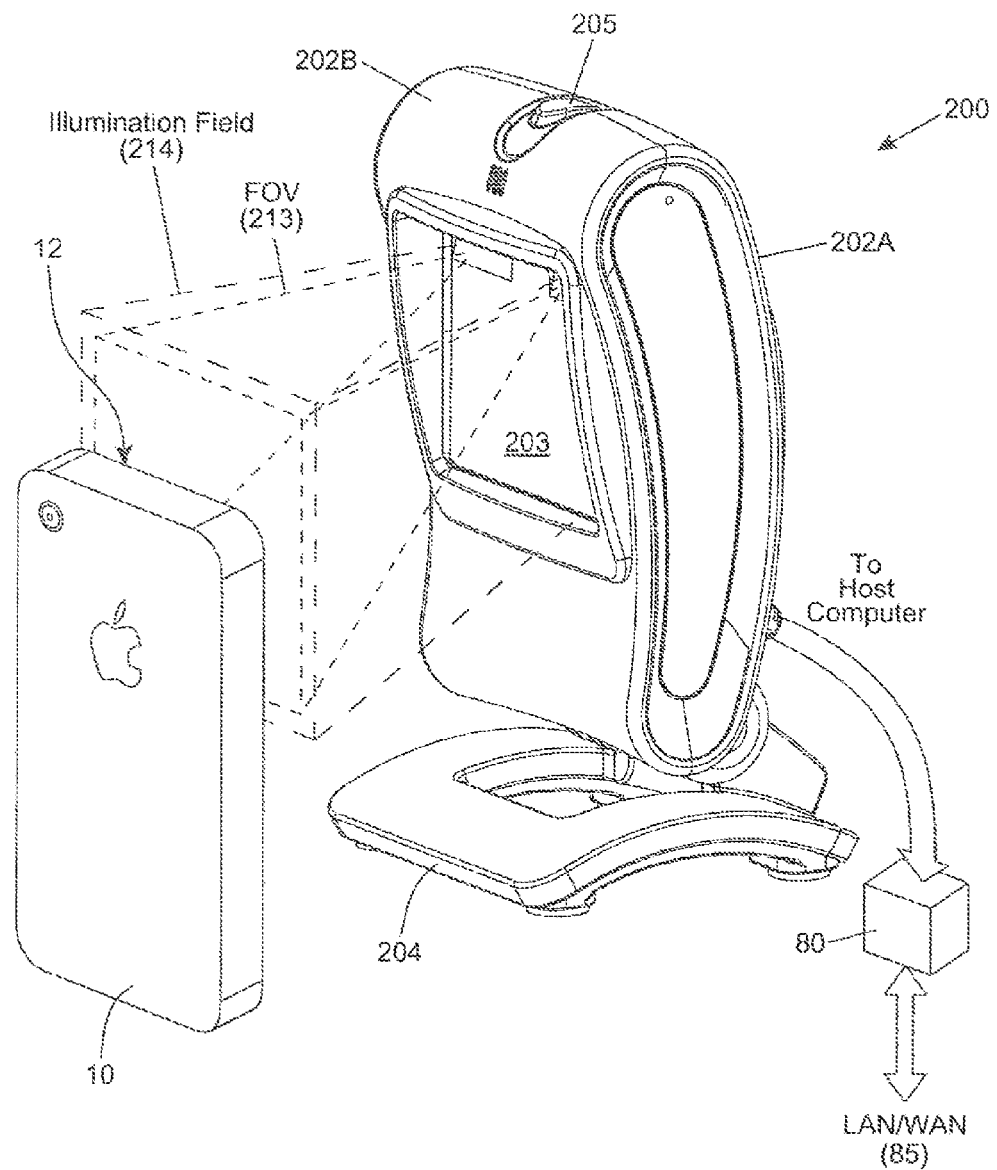
FIG. 5A is a perspective view of an illustrative embodiment of a hand/countertop supportable digital-imaging based bar code symbol reading system of the present disclosure, wherein, upon a bar-coded store coupon being displayed on a smart-phone in a conventional manner, the image formation and detection subsystem forms and detects one or more digital images of the displayed bar-coded store coupon, while the illumination subsystem is automatically deactivated or turned off as necessary and a digital image processing subsystem automatically processes the captured digital images so that any bar code symbol graphically represented therein will be read, and corresponding symbol character data is generated for transmission to and use by the host computing system.
Figure 6:
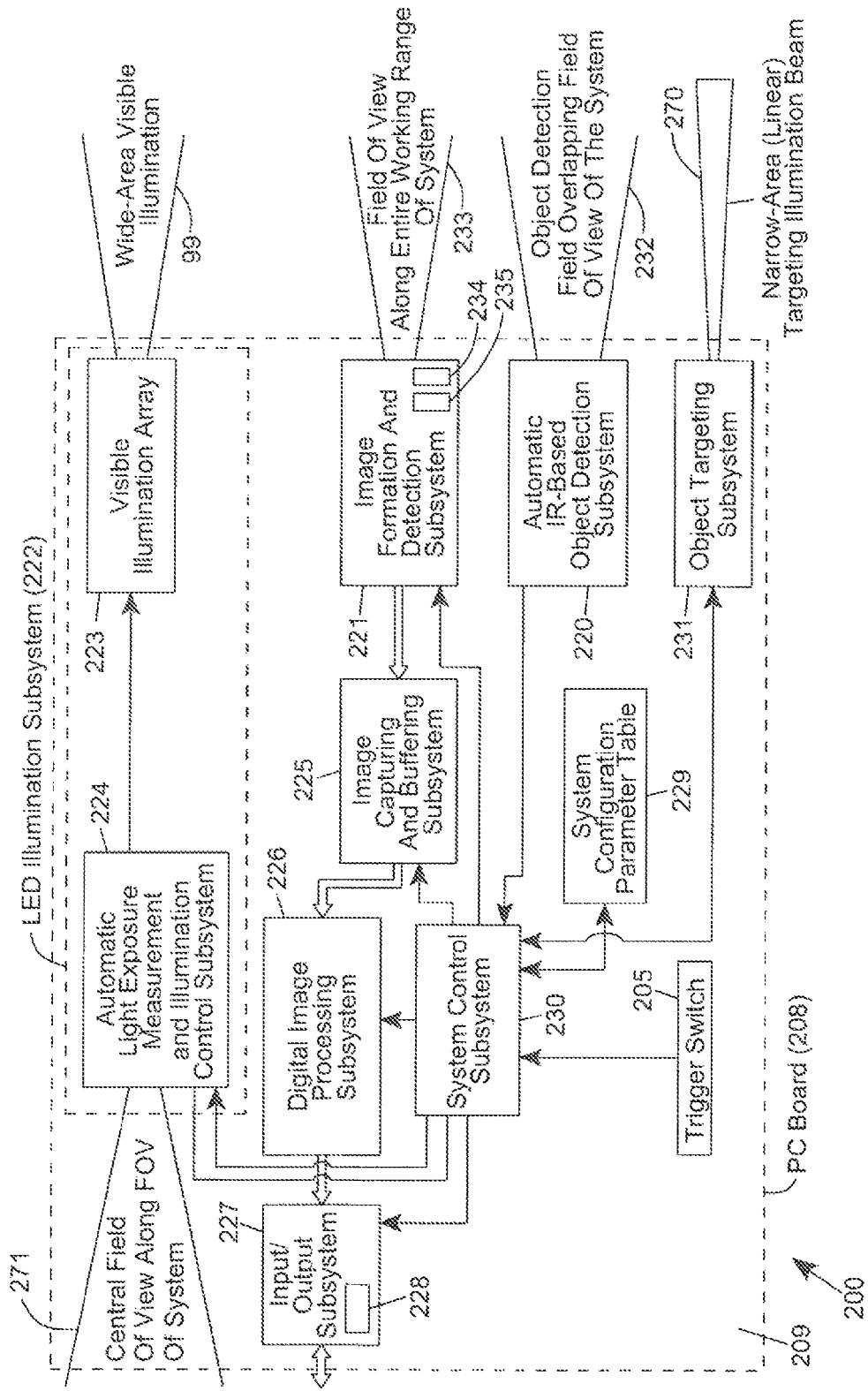
FIG. 6 is a schematic block diagram showing the primary system components of a system design for the hand-supportable digital imaging system illustrated in FIG. 5A through 5B.

FIG. 2A shows a mobile smart phone 10 displaying a bar-coded store coupon in its "Normal Bar-Code Coupon Display Mode" at a POS station in a retail store only supporting the digital imaging bar code symbol reading system 20 as shown in FIG. 5A through 6. In this situation, the consumer will operate his or her smart-phone application in its "Normal Coupon Display Mode," displaying each bar-coded store coupon for reading by the digital imaging bar code symbol reading system operating in its light emitting-based Bar-Code Bar-Coded Coupon Reading Mode. In this mode, the light emitting screen of the user's smart-phone displays the bar-coded store coupon in its Normal Coupon Display Mode, typically while the digital imaging bar code symbol reader 200, without its illumination subsystem 222 activated, automatically detects and processes digital images of the bar-coded coupon displayed on the light emitting screen in effort to read the bar-coded coupon for redemption at the POS station of the store.

FIG. 2B shows the intensity profile from the light emitting screen of the mobile smart phone of FIG. 2A displaying a bar-coded coupon in its "PCM-Based Coupon Display Mode" at a retail store. The bar-coded coupon, displayed in this manner, can be read at the POS station using a laser scanning bar code symbol reading system 100 shown in FIGS. 3A and 3B and operating according to FIGS. 4A and 4B. In this mode, the application converts the digital image of the bar code symbol structure into pulse width modulated (PCM) drive pulses which are used to energize and de-energize a substantial portion of the pixels on the light emitting display surface so that this portion of the light emitting display surface emits red-wavelengths of light energy at rate which temporally corresponds to the spatial frequency of the bars and spaces of said 1D bar code symbol. While operating in its PCM-Based Coupon Reading Mode with its laser scanning mechanism disabled (or deactivated every predetermined number of scanning cycles), the collection optics 106 and photo-detector 106A of the laser scanning bar code symbol reader 100 collects and detects the red-wavelengths of PCM light intensity pattern (i.e. PCM-based code signal) transmitted from the light emitting display screen, which are processed by analog scan data signal processor/digitizer 107, so as to generate scan data signals which are subsequently processed to read the displayed bar-coded store coupon for redemption at the POS station of the store.

When operating in its PCM-Based Coupon Reading Mode, the laser-scanning based bar code symbol reader could have its laser diode 112 and scanning mechanism 110 both deactivated (i.e. turned off) while its optics detect and process displayed pulses of red light from the light emitting screen, attempting to decode the bar-coded content encoded within the displayed bar-coded store coupon. This deactivation could be maintained while the bar code reader 100 is operated in this mode of operation. Alternatively, the laser-scanning bar code symbol reader can be programmed to automatically toggle (i.e. switch) between its normal code symbol reading mode and its PCM-based coupon reading mode automatically toggle during normal operation, so that the laser 112 (and laser scanning mechanism) are deactivated during every predetermined number of sweeps of the scanning mirror 134A. Once operating in this mode, the light emitting screen of the smart-phone or cell-phone is moved in proximity with the laser-scanning bar code symbol reader scanner, and allowed to detect the emitted pulses of red light from the light emitting screen and decode the displayed bar-coded store coupon 100. This technique can be used with any laser-scanning based system, including omni-directional and single line scanning systems. The application could be used with any screen such as a cell phone, TV, or monitor.

In the illustrative embodiment, the application running on the smart-phone or cell-phone is also capable of managing bar-coded store coupons in physical and electronic stream of commerce, as described in greater detail hereinafter. By decoding a captured bar-coded store coupon and flashing PCM pulses of red light from its light emitting screen, equivalent to the content of the bar-coded coupon, the smart-phone or cell phone application effectively converts any smartphone or cell phone with an integrated digital camera and light emitting screen, into PCM-based bar-code generator. As shown in the illustrative embodiment, digital image of the bar-coded store coupon can be displayed on the top or upper portion of the light emitting screen 12A, whereas the PCM red light pulse pattern can be emitted (i.e. displayed) from the bottom or lower portion of the light emitting screen 12B, as shown in FIG. 2A. This bar-coded coupon display scheme provides both laser-based and imaging-based bar code symbol readers an opportunity to read bar-coded store coupons displayed on the light emitting screens of smart phones and cell-phones, as the point of redemption at a POS station.

Specification of a Laser Scanning Bar Code Symbol Reader for Reading Bar-Coded Store Coupons Referring now to FIG. 3A through 4B, a hand-supportable laser scanning bar code symbol reading system 100, having a normal code reading mode of operation and a PCM-based code reading mode of operation, will be described in detail.

Figure 3A:
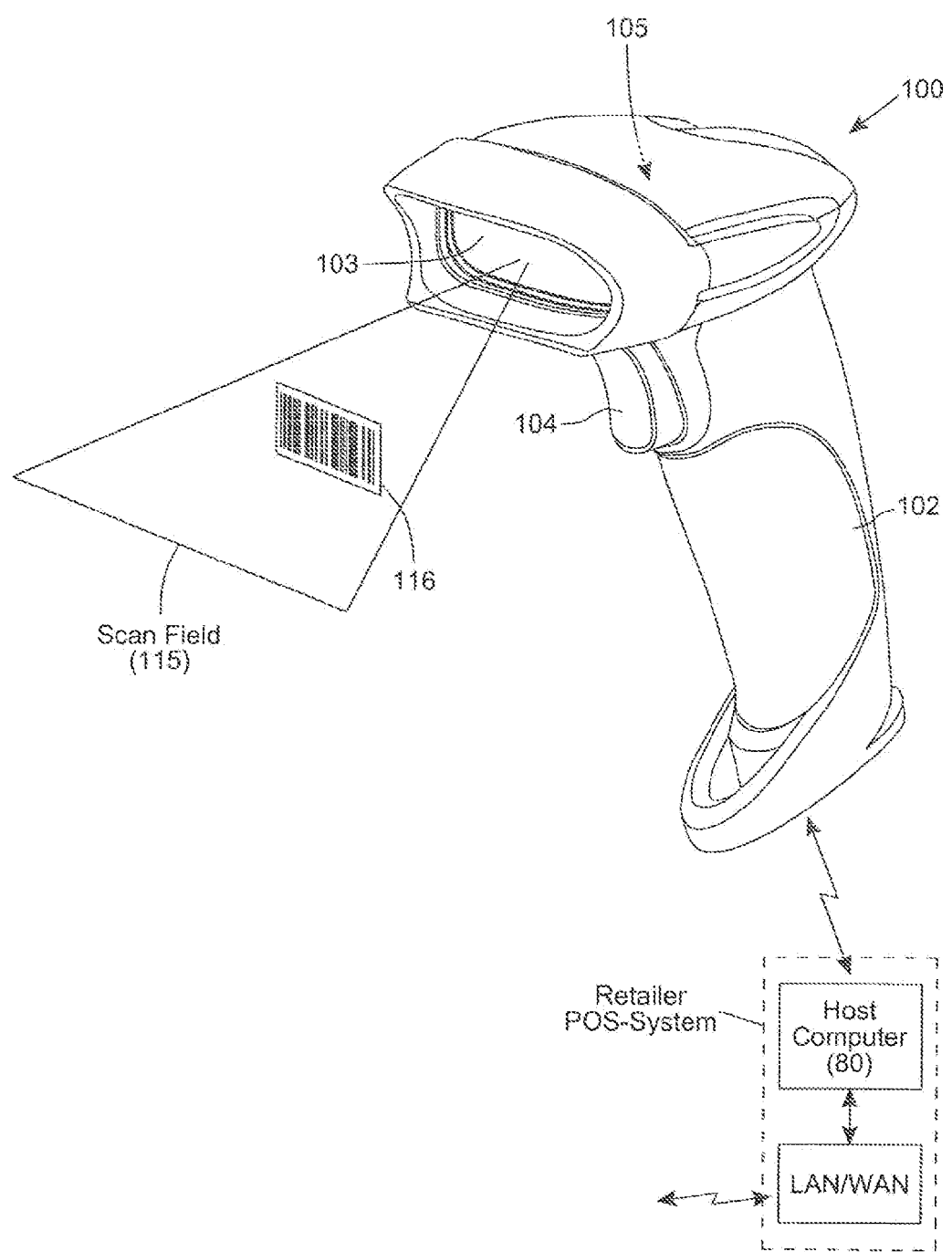
FIG. 3A is a perspective view of a hand-held laser scanning bar code symbol reader having a mode of operation allowing bar-coded store coupons displayed on the light emitting screen of a smart-phone to be read and redeemed at a retail POS station.
Figure 3B:
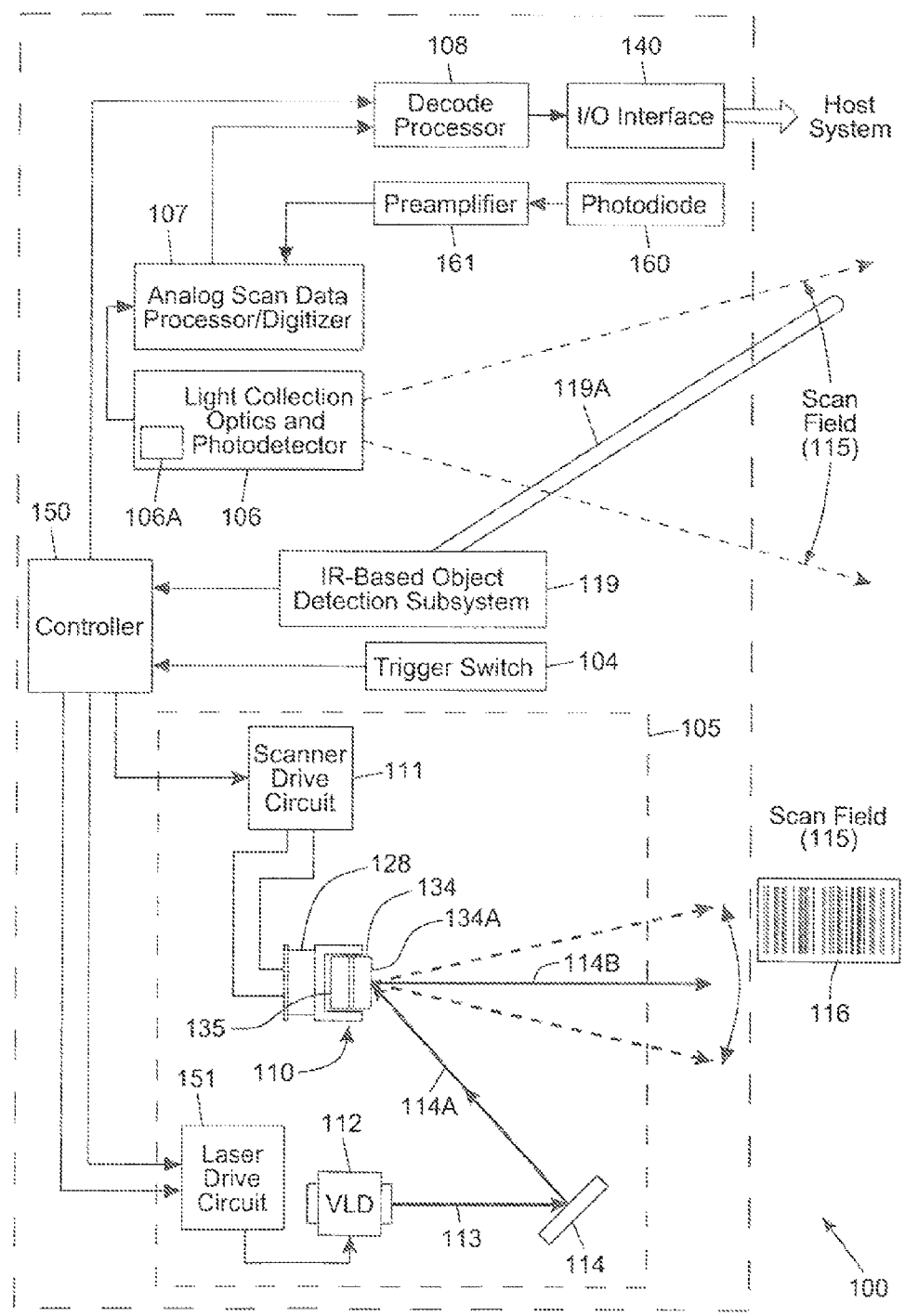
FIG. 3B is a schematic representation of the laser scanning bar code symbol reader shown in FIG. 3A.

As shown in FIGS. 3A and 3B, the manually-triggered laser scanning bar code symbol reader 100 comprises: a hand-supportable housing 102 having a head portion and a handle portion supporting the head portion; a light transmission window 103 integrated with the head portion of the housing 102; a manually-actuated trigger switch 104 integrated with the handle portion of the housing, for activating its laser scanning module 105 with a laser scanning field 115; an IR-based object detection subsystem 119 generating an IR beam within the laser scanning field, for automatically detecting the presence of an object in the laser scanning field, and triggering the system when an object is automatically detected in the scanning field; a laser scanning module 105, for repeatedly scanning, across the laser scanning field, a visible laser beam generated by a laser source 112 (e.g. VLD or IR LD) having optics to produce a laser scanning beam focused in the laser scanning field, in response to a control signal generated by a system controller 150; wherein the laser scanning module 105 also includes a laser drive circuit 151 for receiving control signals from system controller 150, and in response thereto, (i) providing laser (diode) drive current signals to the laser source 112 to produce a laser scanning beam during the method of bar code symbol reading during its normal reading mode, and (ii) not providing laser drive current signals to the laser source 112 to ensure not to produce a laser scanning beam during its "bar-coded coupon reading" mode; light collection optics 106 for (i) collecting light reflected/scattered from scanned objects in the scanning field during laser scanning of physical coupons or bar code symbols at the POS station, and (ii) light emitted from the light emitting screen during the PCM-Based Coupon Display Mode shown in FIG. 2B, and a photo-detector for detecting the intensity of collected light (during laser scanning and bar-coded coupon reading modes) and generating an analog scan data signal corresponding to said detected light intensity during such operations; a photodiode 160 for detecting PCM signals transmitted from mobile or cell phones as taught here, and a preamplifier circuit 161 for pre-amplifying electrical signals from photo-diode 161; an analog scan data signal processor/digitizer 107 for processing the analog scan data signals (including PCM-based code signals detected by photo-diode 161 and amplified by preamplifier circuit 161) and converting the processed analog scan data signals into digital scan data signals, which are converted into digital words representative of the relative width of the bars and spaces in the scanned code symbol structure; programmed decode processor 108 for decode processing digitized data signals, and generating symbol character data representative of each bar code symbol (i) scanned by the visible laser scanning beam during the normal reading mode of operation, and (ii) emulated (i.e. represented) by the PCM red light emission (i.e. PCM-based code signals) produced from the light emitting screen of the mobile device, during the PCM-based coupon reading mode illustrated in FIG. 2B; an input/output (I/O) communication interface module 140 for interfacing with a host communication system and transmitting symbol character data thereto via wired or wireless communication links that are supported by the symbol reader and host system; and a system controller 150 for generating the necessary control signals for controlling operations within the hand-supportable laser scanning bar code symbol reading system.

Preferably, IR-based object detection subsystem 219 is mounted in the front of its light transmission window 103 so that the IR light transmitter and IR light receiver components of subsystem 219 have an unobstructed view of an object within the laser scanning field of the system, as shown in FIG. 3A. Also, the IR object presence detection module 219 can transmit into the scanning field 115, IR signals having a continuous low-intensity output level, or having a pulsed higher-intensity output level, which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

As shown in FIG. 3B, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a laser beam source 112 for producing a visible laser beam 113A for producing a visible laser beam 113; and a beam deflecting mirror 114 for deflecting the laser beam 113 as incident beam 114A towards the mirror component of the laser scanning assembly 110, which sweeps the deflected laser beam 114B across the laser scanning field and a bar code symbol 116 that might be simultaneously present therein during normal laser scanning operations.

As shown in FIG. 3B, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135), which is driven by a drive circuit 111 so that it generates magnetic forces on opposite poles of the permanent magnet 135, during scanning operation.

In general, system 100 supports a manually-triggered triggered mode of operation, and the bar code symbol reading method described below.

During normal laser scanning/reading operations, in response to a triggering event (i.e. manually pulling trigger 104), the laser scanning module 105 generates and projects a laser scanning beam through the light transmission window 103, and across the laser scanning field external to the hand-supportable housing, for scanning an object in the scanning field. The laser scanning beam is generated by the laser beam source 112 in response control signals generated by the system controller 150. The scanning element (i.e. mechanism) 134 repeatedly scans the selected laser beam across a code symbol residing on an object in the near portion or far portion of the laser scanning field 115. Then, the light collection optics 106 collects light reflected/scattered from scanned code symbols on the object in the scanning field, and the photo-detector 106A automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by either a laser scanning beam. Symbol character data corresponding to the bar codes read by the decoder 108, are then transmitted to the host system via the I/O communication interface 140 which may support either a wired and/or wireless communication link, well known in the art. During object detection and laser scanning operations, the system controller 150 generates the necessary control signals for controlling operations within the hand-supportable laser scanning bar code symbol reading system.

Figure 4A:
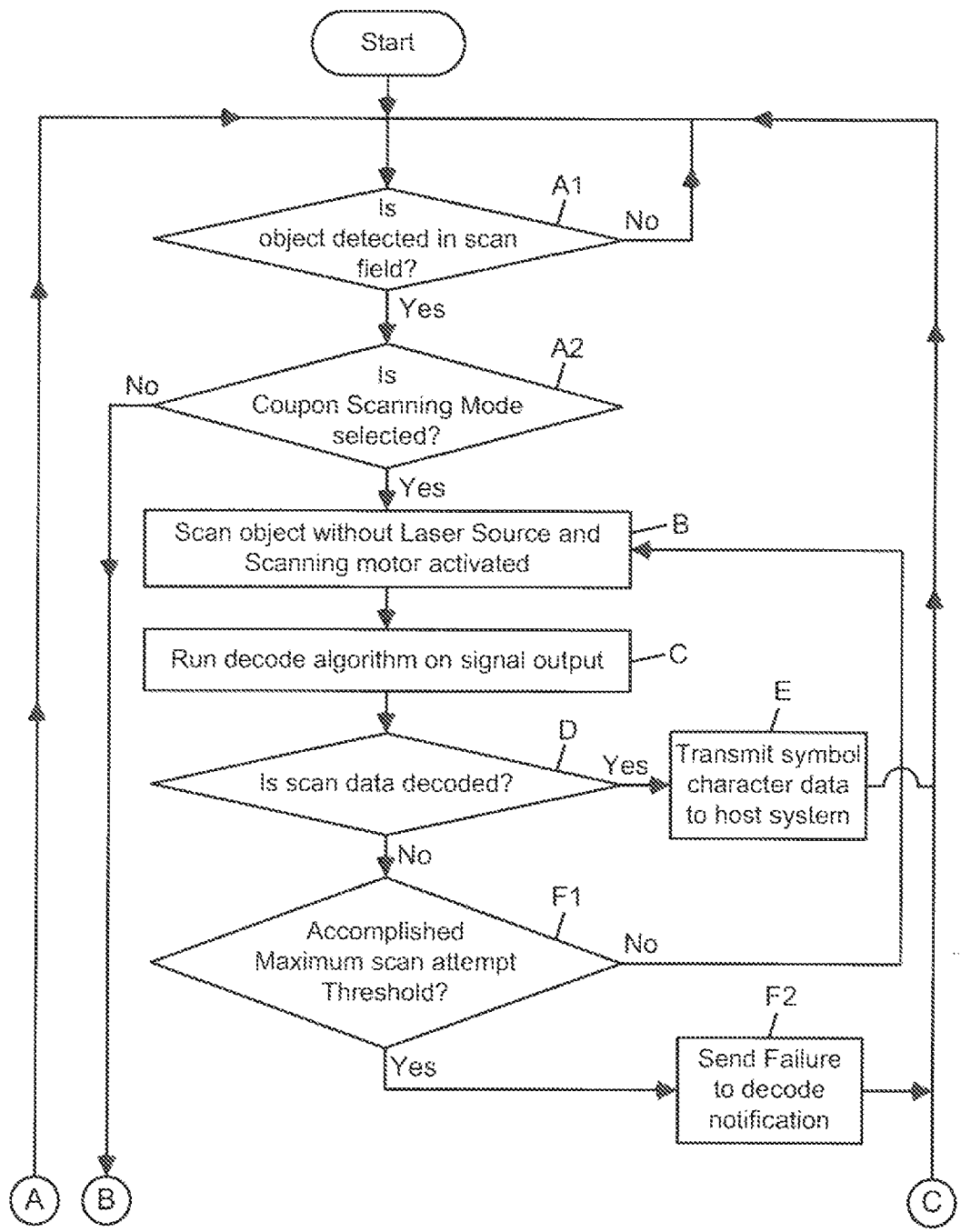
FIGS. 4A and 4B, taken together, set forth a flow chart describing the method of operation of the bar code symbol reader shown in FIGS. 3A and 2B, during the reading of bar-coded coupons displayed on light emitting display surfaces in accordance with the principles illustrated in FIG. 2B, while the bar code symbol reader is operating in its coupon scanning mode.
Figure 4B:
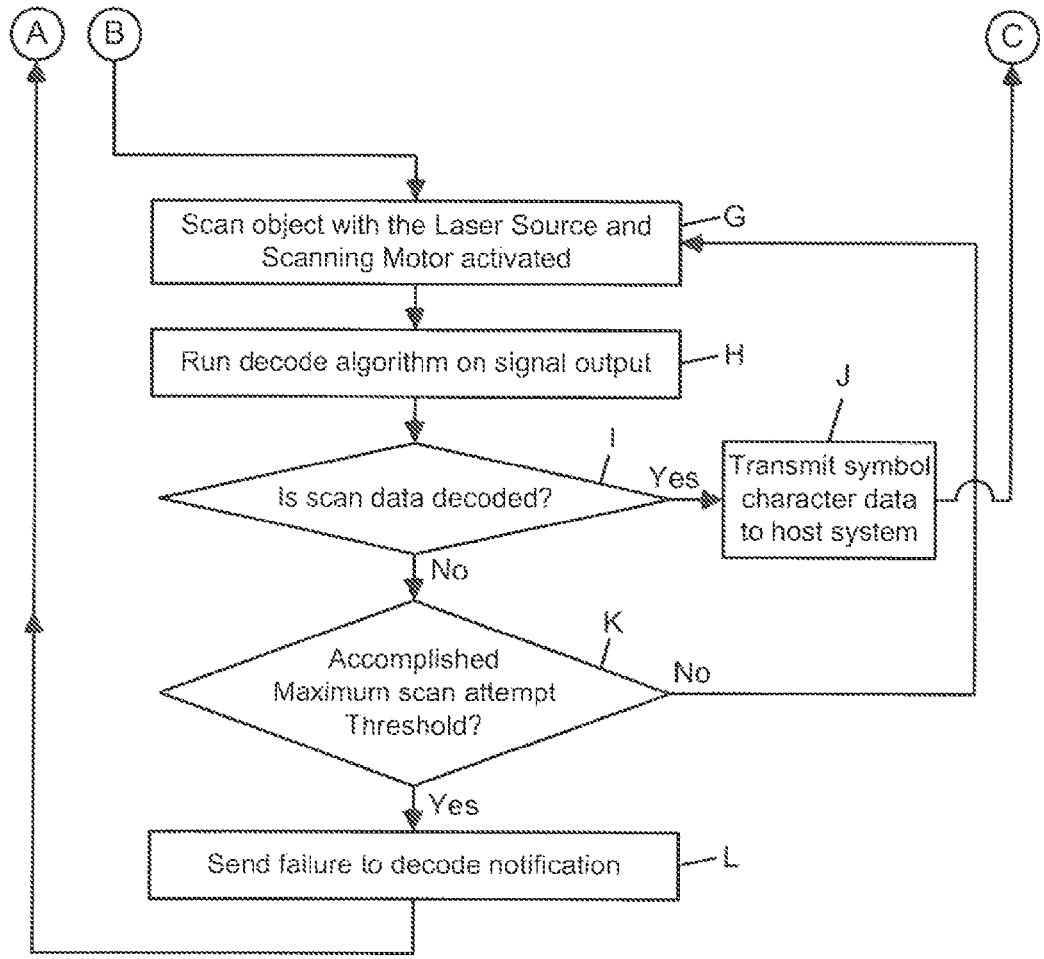

Referring to FIGS. 4A and 4B, the method of operation of the laser scanning bar code symbol reader described above will be described while reading bar-coded coupons displayed on light emitting screens 12 of mobile smart-phones or cell phones 10, in accordance with the principles illustrated in FIG. 2B.

In FIGS. 4A and 4B, the flow chart describes the method of reading bar code symbols carried out by the laser scanning based bar code reader 100 shown in FIGS. 5 and 6 and described above.

As indicated at Block A1 in FIG. 4A, the system controller determines if an object has been detected in the field of view (FOV). When the system is operating in its manually-triggered mode, this operation can be achieved by the user pulling the manually pulling trigger switch 5A. When the system is operating in its automatically-triggered mode of operation, this operation can be achieved by the object detection subsystem automatically detecting the presence of an object within the field of view (FOV) of the system.

In the event that an object is detected, the system proceeds to Block A2, and determines whether or not the coupon scanning mode has been selected. If so, then the system proceeds to Block B and the object is scanned without the laser source 112 and scanning motor 128 being activated.

At Block C, the system controller 150 runs a decode algorithm on the captured scan data, and if at Block D, a bar code symbol is decodable, then at Block E, the bar code symbol is decoded and the symbol character data is transmitted to the host system. If, however, at Block D a bar code symbol is not decodable, then the system controller 150 determines at Block F1 whether or not the maximum scan attempt threshold has been reached, and if not, then the system controller 150 returns to Block B, and resumes the flow as indicated. However, if at Block F1, the system controller 150 determines that the maximum scan attempt threshold has been accomplished, then the system controller 150 proceeds to Block F2 and generates or sends a failure to decode notification to the user.

If at Block A2, the coupon scanning mode is not selected, then the system proceeds to Block G, in FIG. 4B, and scans the object with the laser source 112 and scanning motor 128 activated. Then at Block H, one or more decode algorithms are run on the collected scan data, and at Block I, the system controller 150 determines whether or not a bar code symbol is decoded. If at Block I, a bar code symbol is decoded, then at Block J the bar code symbol is decoded and symbol character data produced is transmitted to the host system, and system control returns to Block A1, as shown in FIG. 4A. If, however, at Block I, no bar code symbol is decoded, then the system controller 150 determines whether or not the maximum scan attempt threshold (i.e. how many attempts to decode are permitted) has been reached, and so long as the maximum number has not been reach, the system controller 150 maintains a control loop between Blocks K and G, as indicated in FIG. 4B. When the maximum number of attempts to decode has been reached at Block K, then system controller 150 sends, at Block L, a failure to decode notification to the operator, and the system returns to Block A1, as shown in FIG. 4A.

Specification of Digital Imaging Bar Code Symbol Reader for Reading Bar-Coded Store Coupons Referring now to FIGS. 5A, 5B and 6, a hand/countertop supportable digital-imaging bar code symbol reading system 200, having a normal code reading mode of operation and a PCM-based code reading mode of operation, will be described in detail.

During its normal code reading mode of operation, when a physical bar-coded store coupon (or bar coded product) is presented to the system 200 for reading, or when a digital image of a bar-coded coupon is displayed on the LCD panel of a smart phone 10 for reading, LED-based illumination subsystem 222 is automatically activated, and controlled as necessary, in view of ambient lighting conditions, while image formation and detection subsystem 221 of system 200 forms and detects one or more digital images of the displayed bar-coded store coupon, and digital image processing subsystem automatically processes the captured digital images so that any bar code symbol graphically represented therein will be read, and corresponding symbol character data generated for transmission to and use by the host computing system.

During its PCM-based code reading mode of operation shown in FIG. 5A, when a bar-coded store coupon is displayed on a smart-phone 10 as a PCM-based code signal (i.e. a modulated sequence of red light pulses), LED-based illumination subsystem 222 is automatically deactivated (or turned off) while the image formation and detection subsystem 221 forms and detects (at a sufficient rate) a sequence of digital images of the PCM-encoded code (pulsed light) signal from the LCD surface of smart phone 10, and digital image processing subsystem automatically processes the sequence of captured digital images at a sufficient rate so that any bar code symbol represented in the PCM-based code signal will be automatically read, and corresponding symbol character data is generated for transmission to and use by the host computing system.

In the illustrative embodiment, system 200 is programmed so that its normal code reading mode of operation and its PCM-based code reading mode of operation are automatically toggled (i.e. switched) during system operation, each time the digital imaging system 200 is triggered by automated IR-based object detection (e.g. in response to detecting a mobile phone or physical product or printed coupon) or manual actuation of trigger switch 205, as the case may be.

As shown in FIG. 5B, the digital imaging system of FIG. 5A comprises a PC board assembly arranged between the front housing portion 202B and rear housing portion 202A, with the hinged base 204 being pivotally connected to the rear portion of the system housing by way of an axle structure 231.

As shown in FIG. 5A, the digital-imaging based bar code symbol reading system 200 comprises: a hand-supportable housing 202 having (i) front housing portion 202B with a window aperture 206 and an imaging window panel 203 installed therein; and (ii) rear housing portion 202A. As shown, a single PC board based optical bench 208 (having optical subassemblies mounted thereon) is supported between the front and rear housing portions 202B and 203A which, when brought together, form an assembled unit. Base portion 204 is connected to the assembled unit by way of a pivot axle structure 231 that passes through the bottom portion of the imager housing and the base portion so that the hand-supportable housing and base portion are able to rotate relative to each other. The host/imager interface cable 210 passes through a port formed in the rear of the rear housing portion, and interfaces with connectors mounted on the PC board 208.

As shown in FIG. 6, the digital-imaging based code symbol reading system 200 comprises a number of subsystem components, namely: an image formation and detection (i.e. camera) subsystem 221 having image formation (camera) optics 234 for producing a field of view (FOV) upon an object to be imaged and a CMOS or like area-type image detection array 235 for detecting imaged light reflected off the object during illumination operations in an image capture mode in which at least a plurality of rows of pixels on the image detection array are enabled; a LED-based illumination subsystem 222 employing LED illumination array 232 for producing a field of narrow-band illumination 226 within the entire FOV 233 of the image formation and detection subsystem 221 so that illumination reflected from the illuminated object is transmitted through a narrow-band transmission-type optical filter 240 realized within the hand-supportable and detected by the image detection array 235, while all other components of ambient light are substantially rejected; an object targeting illumination subsystem 231 as described hereinabove; an IR-based object detection subsystem 220 for producing an IR-based object detection field 232 within the FOV of the image formation and detection subsystem 221, and automatically detecting the presence of objects therein; an automatic light exposure measurement and illumination control subsystem 224 for controlling the operation of the LED-based illumination subsystem 222 during the digital imaging of (i) bar code symbols printed on substrates and also (ii) digital images of bar code symbols displayed from light emitting screens 12 of mobile smart-phones, cell-phones, and the like 10; an image capturing and buffering subsystem 225 for capturing and buffering 2-D images detected by the image formation and detection subsystem 221: a digital image processing subsystem 226 for processing 2D digital images captured and buffered by the image capturing and buffering subsystem 225 and reading 1D and/or 2D bar code symbols represented therein; and an input/output subsystem 227 for outputting processed image data and the like to an external host system or other information receiving or responding device; and a system control subsystem 230 integrated with the subsystems above, for controlling and/or coordinating these subsystems during system operation.

The primary function of the object targeting subsystem 231 is to automatically generate and project a visible linear-targeting illumination beam 270 across the central extent of the FOV of the system, in response to either (i) the automatic detection of an object during hand-held imaging modes of system operation, or (ii) manual detection of an object by an operator when s/he manually actuates the manual actuatable trigger switch 205. In order to implement the object targeting subsystem 231, the OCS assembly 278 also comprises a fourth support structure for supporting the pair of beam folding mirrors above a pair of aperture slots, which in turn are disposed above a pair of visible LEDs arranged on opposite sites of the FOV optics 234 so as to generate a linear visible targeting beam 270 that is projected off the second FOV folding 275 and out the imaging window 203, as shown and described in detail in US Patent Publication No. US20080314985 A1, incorporated herein by reference in its entirety.

The primary function of the object detection subsystem 220 is to automatically produce an object detection field 232 within the FOV 233 of the image formation and detection subsystem 221, to detect the presence of an object within the object detection field 232, and to generate control signals which are supplied to the system control subsystem 230 for indicating when and where an object is detected within the object detection field of the system. As shown in FIG. 5B, IR LED 290A and IR photodiode 290B are supported in the central lower portion of the optically-opaque structure 233A, below the linear array of LEDs 223. The IR LED 290A and IR photodiode 290B are used to implement the automatic IR-based object detection subsystem 220.

The image formation and detection (i.e. camera) subsystem 221 includes image formation (camera) optics 234 for providing a field of view (FOV) 233 upon an object to be imaged and a CMOS area-type image detection array 235 for detecting imaged light reflected off the object during illumination and image acquisition/capture operations.

The primary function of the LED-based illumination subsystem 222 is to produce a wide-area illumination field 236 from the LED array 223 when an object is automatically detected within the FOV. Notably, the field of illumination has a narrow optical-bandwidth and is spatially confined within the FOV of the image formation and detection subsystem 221 during modes of illumination and imaging, respectively. This arrangement is designed to ensure that only narrow-band illumination transmitted from the illumination subsystem 222, and reflected from the illuminated object, is ultimately transmitted through a narrow-band transmission-type optical filter subsystem 240 within the system and reaches the CMOS area-type image detection array 235 for detection and processing, whereas all other components of ambient light collected by the light collection optics are substantially rejected at the image detection array 235, thereby providing improved SNR, thus improving the performance of the system.

The narrow-band transmission-type optical filter subsystem 240 is realized by (1) a high-pass (i.e. red-wavelengths of reflecting) filter element embodied within at the imaging window 203, and (2) a low-pass filter element mounted either before the CMOS area-type image detection array 235 or anywhere after beyond the high-pass filter element, including being realized as a dichroic mirror film supported on at least one of the FOV folding mirrors 274 and 275, shown in FIGS. 5A and 5B.

As shown in FIG. 5B, the linear array of LEDs 223 is aligned with an illumination-focusing lens structure 230 embodied or integrated within the upper edge of the imaging window 203. Also, the light transmission aperture 260 formed in the PC board 208 is spatially aligned within the imaging window 203 formed in the front housing portion 5A. The function of illumination-focusing lens structure 230 is to focus illumination from the single linear array of LEDs 223, and to uniformly illuminate objects located anywhere within the working distance of the FOV of the system.

As shown in FIG. 5B, an optically-opaque light ray containing structure 133 is mounted to the front surface of the PC board 208, about the linear array of LEDs 223. The function of the optically-opaque light ray containing structure 233 is to prevent transmission of light rays from the LEDs to any surface other than the rear input surface of the illumination-focusing lens panel 203, which uniformly illuminates the entire FOV of the system over its working range. When the front and rear housing panels 202B and 202A are joined together, with the PC board 208 disposed therebetween, the illumination-focusing lens panel 203 sits within slanted cut-aways formed in the top surface of the side panels, and illumination rays produced from the linear array of LEDs 223 are either directed through the rear surface of the illumination-focusing lens panel 203 or absorbed by the black colored interior surface of the structure 233A.

As shown in FIGS. 5A and 5B the optical component support (OCS) assembly 278 comprises: a first inclined panel for supporting the FOV folding mirror 274 above the FOV forming optics, and a second inclined panel for supporting the second FOV folding mirror 275 above the light transmission aperture 260. With this arrangement, the FOV employed in the image formation and detection subsystem 221, and originating from optics supported on the rear side of the PC board, is folded twice, in space, and then projected through the light transmission aperture and out of the imaging window of the system.

The automatic light exposure measurement and illumination control subsystem 224 performs two primary functions: (1) to measure, in real-time, the power density [joules/cm] of photonic energy (i.e. light) collected by the optics of the system at about its image detection array 235, and to generate auto-exposure control signals indicating the amount of exposure required for good image formation and detection; and (2) in combination with the illumination array selection control signal provided by the system control subsystem 230, to automatically drive and control the output power of the LED array 223 in the illumination subsystem 222, so that objects within the FOV of the system are optimally exposed to LED-based illumination and optimal images are formed and detected at the image detection array 235. The OCS assembly 278 also comprises a third support panel for supporting the parabolic light collection mirror segment 279 employed in the automatic exposure measurement and illumination control subsystem 224. Using this mirror 278, a narrow light collecting FOV is projected out into a central portion of the wide-area FOV 233 of the image formation and detection subsystem 221 and focuses collected light onto photo-detector 281, which is operated independently from the area-type image sensing array, schematically depicted in FIG. 6 by reference numeral 325.

The primary function of the image capturing and buffering subsystem 225 is (1) to detect the entire 2-D image focused onto the 2D image detection array 235 by the image formation optics 234 of the system, (2) to generate a frame of digital pixel data for either a selected region of interest of the captured image frame, or for the entire detected image, and then (3) buffer each frame of image data as it is captured. Notably, in the illustrative embodiment, the system has both single-shot and video modes of imaging. In the single shot mode, a single 2D image frame (231) is captured during each image capture and processing cycle, or during a particular stage of a processing cycle. In the video mode of imaging, the system continuously captures frames of digital images of objects in the FOV. These modes are specified in further detail in US Patent Publication No. US20080314985 A1, incorporated herein by reference in its entirety.

The primary function of the digital image processing subsystem 226 is to process digital images that have been captured and buffered by the image capturing and buffering subsystem 225, during modes of illumination and operation. Such image processing operations include image-based bar code decoding methods as described in U.S. Pat. No. 7,128,266, incorporated herein by reference in its entirety.

The primary function of the input/output subsystem 227 is to support universal, standard and/or proprietary data communication interfaces with external host systems and devices, and output processed image data and the like to such external host systems or devices by way of such interfaces. Examples of such interfaces, and technology for implementing the same, are given in U.S. Pat. Nos. 6,619,549 and 6,619,549, incorporated herein by reference in their entirety.

The primary function of the system control subsystem 230 is to provide some predetermined degree of control, coordination and/or management signaling services to each subsystem component integrated within the system, as shown. While this subsystem can be implemented by a programmed microprocessor, in the preferred embodiments of the present invention, this subsystem is implemented by the three-tier software architecture supported on micro-computing platform described in U.S. Pat. No. 7,128,266, and elsewhere hereinafter.

The primary function of the manually-activatable trigger switch 205 integrated with the housing is to enable the user, during a manually-triggered mode of operation, to generate a control activation signal (i.e. trigger event signal) upon manually depressing the same (i.e. causing a trigger event), and to provide this control activation signal to the system control subsystem 230 for use in carrying out its complex system and subsystem control operations, described in detail herein.

The primary function of the system configuration parameter table 229 in system memory is to store (in non-volatile/persistent memory) a set of system configuration and control parameters (i.e. SCPs) for each of the available features and functionalities, and programmable modes of supported system operation, and which can be automatically read and used by the system control subsystem 230 as required during its complex operations. Notably, such SCPs can be dynamically managed as taught in great detail in co-pending US Publication No. US20080314985 A1, incorporated herein by reference.

Method of Finding and Redeeming Retail Store Coupons

Figure 7:
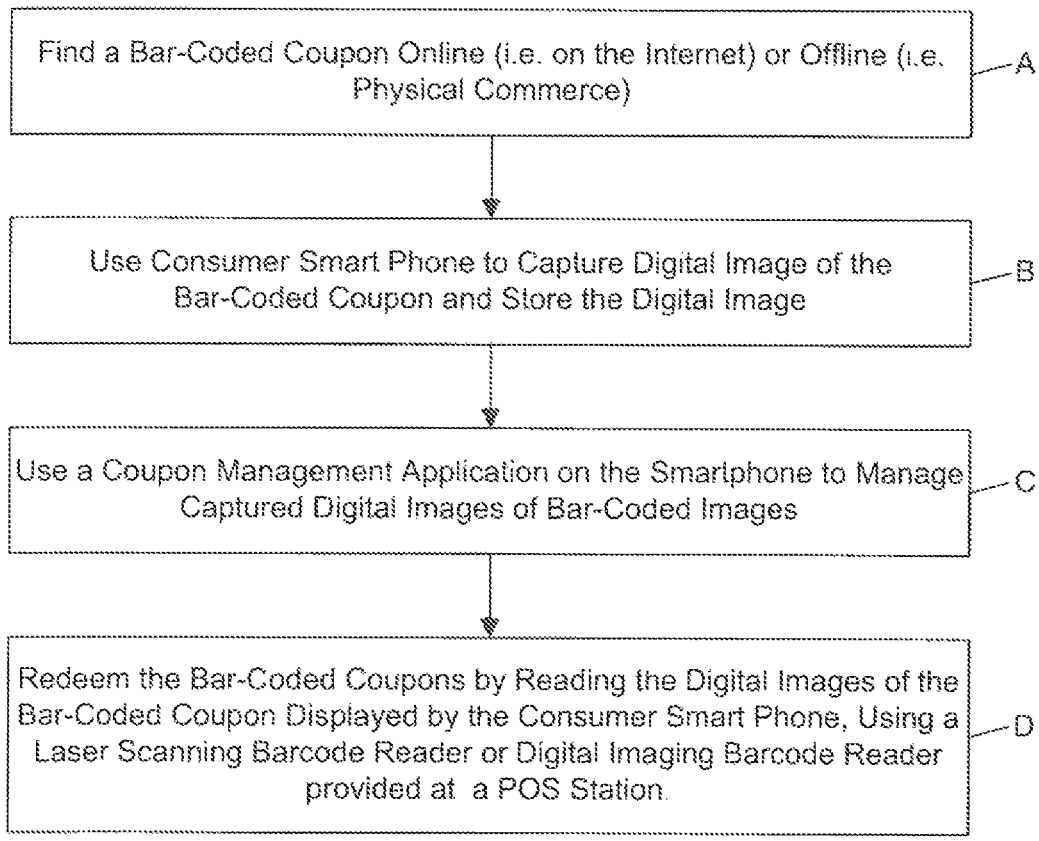
FIG. 7 is a flow chart describing the primary steps carried out by the method of finding and redeeming bar-coded store coupons at the POS station in FIG. 1A, in accordance with the principles of the present disclosure.

In FIG. 7, a method of finding and redeeming retail store coupons is described.

As indicated at Block A in FIG. 7, the first step involves finding a coupon online (i.e. on the Internet) or offline (i.e. physical commerce).

As indicated at Block B, the second step involves using a Web-enabled mobile smart phone 10 as shown in FIGS. 2A and 2B to capture digital image of coupon and store digital image.

As indicated at Block C, the third step of the method involves using a coupon collection, management and redemption application 13, as disclosed herein, to manage digital images of bar-coded store coupons captured online or using integrated digital camera 11.

As indicated at Block D, the fourth step of the method involves redeeming at a POS station, a bar-coded coupon(s) for use in the retail store by reading the digital image of the coupon while being displayed on the light emitting screen 12 of the smart phone 10, using the laser scanning bar code symbol reader 100 shown in FIG. 3A through 5, or the digital imaging bar code symbol reader 200 shown in FIGS. 6A and 6B.

Method of Capturing Bar-Coded Store Coupons for Redemption

Figure 8:
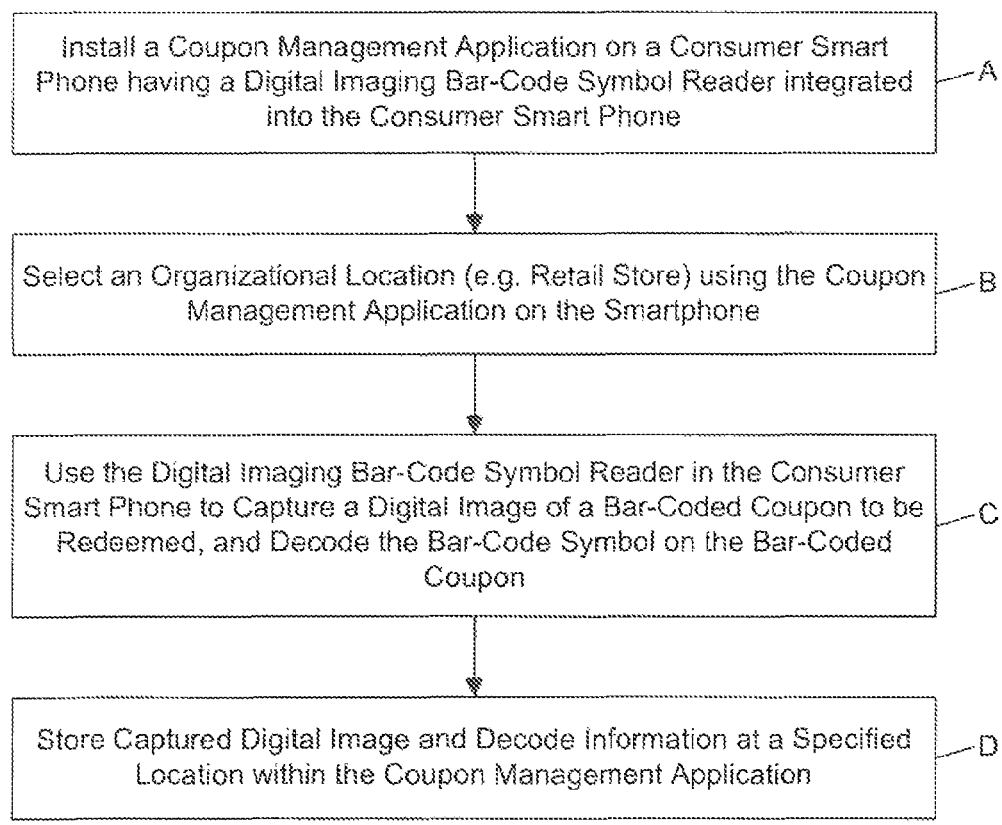
FIG. 8 is a flow chart describing the primary steps carried out by the method of capturing bar-coded store coupons for redemption at the POS station in FIG. 1A, in accordance with the principles of the present disclosure.

In FIG. 8, a method of capturing bar-coded store coupons for redemption is described.

As indicated at Block A, the first step involves installing a coupon collection, management and redemption application on the web-based smart phone 10, which has integrated digital camera 11 and digital imaging bar code symbol reading application 13.

As indicated at Block B, the second step involves selecting an organizational location (e.g. retail store) within the coupon management application 13.

As indicated at Block C, the third step of the method involves using the digital imaging bar code symbol reader 200 in the consumer smart phone 10 to capture a digital image of a bar-coded coupon to be redeemed, and decode the bar code symbol on the coupon.

As indicated at Block D, the fourth step of the method involves storing the captured digital image and decode information at a specified location within the coupon management application 13, for subsequent access and use.

Method of Redeeming Captured Bar-Coded Store Coupons

Figure 9:
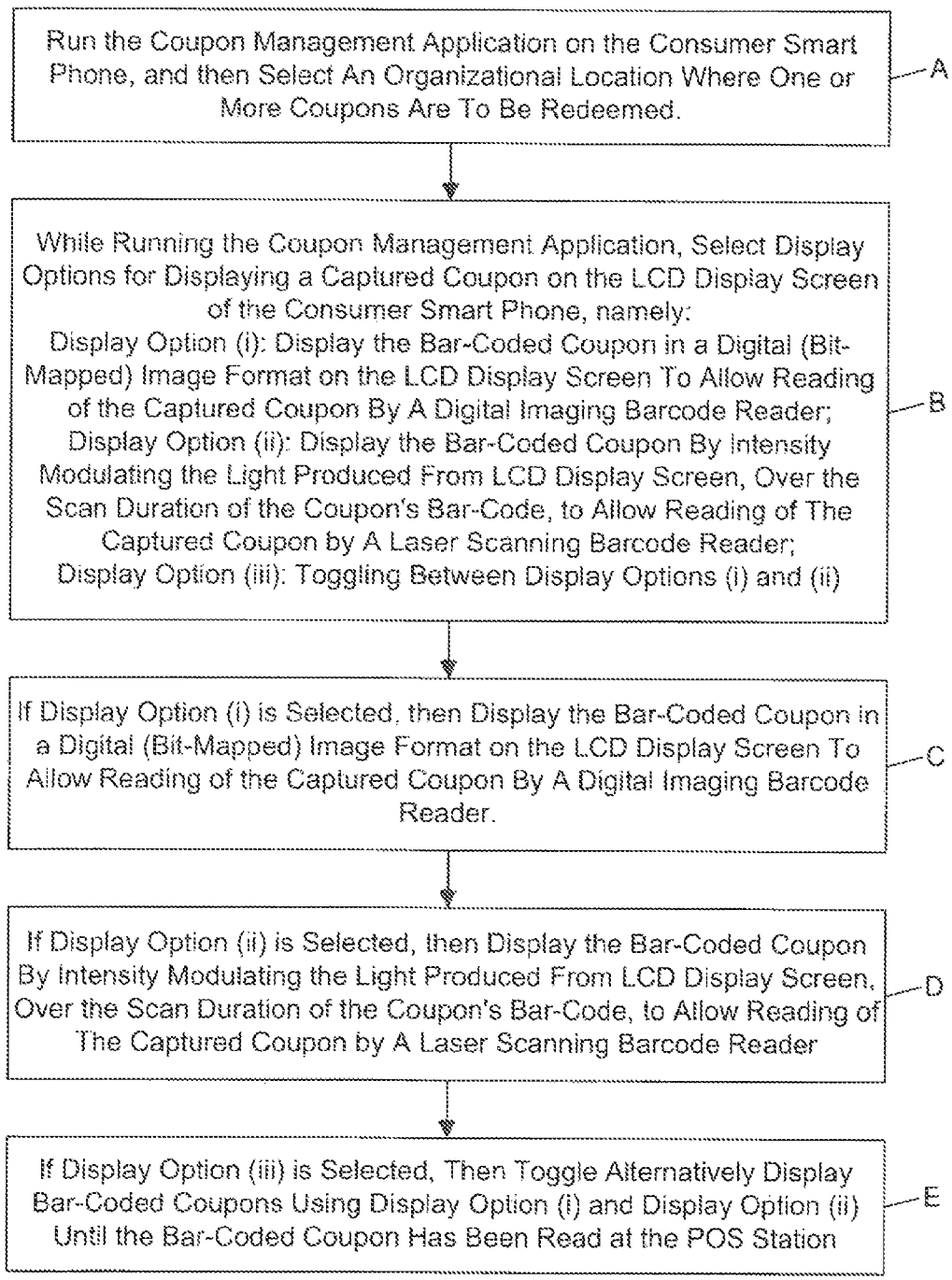
FIG. 9 is a flow chart describing the primary steps carried out by the method of redeeming bar-coded store coupons at the POS station represented in FIG. 1B, in accordance with the principles of the present disclosure.

In FIG. 9, a method of redeeming captured bar-coded store coupons is described.

As indicated at Block A, the first step involves running the coupon management application 12 on the mobile smart phone 10, and then selecting an organizational location (i.e. retail store) where one or more coupons are to be redeemed at a POS station 70.

As indicated at Block B, the second step involves, while running the coupon management application, selecting display options for displaying a captured coupon on the light emitting display screen of the consumer smart phone 10, namely:

Display Option (i) (Normal Coupon Display Mode): display the bar-coded coupon in a digital (bit-mapped) image format on the light emitting screen to allow reading of the captured coupon by a digital imaging barcode reader 200; or Display Option (ii) (PCM-Based Coupon Display Mode): display the bar-coded coupon by emitting red-wavelengths of pulsed light from light emitting display surface 12, at a rate temporally corresponding to the spatial structure of the bars and spaces of the bar code symbol within the bar-coded coupon, so as to allow reading of the captured coupon by a laser scanning bar code symbol reader 100;

Display Option (iii): Toggling Between Display Options (i) and (ii).

As indicated at Block C, the third step involves determining whether or not the display option (i) is selected, and if so, then displaying the bar-coded coupon in a digital (bit-mapped) image format on the light emitting screen to allow reading of the captured coupon by a digital imaging barcode reader 200.

As indicated at Block D, the fourth step involves determining whether or not the display option (ii) is selected, and if so, then displaying the bar-coded coupon by intensity modulating red light pulses produced from light emitting screen 12 of mobile device 10, over the scan duration of the coupon's bar code, to allow reading of the captured coupon by a laser scanning barcode reader 100.

As indicated at Block E, the fourth step involves determining whether or not the display option (iii) is selected, and if so, then toggling, alternatively, the display of the bar-coded coupon(s) using display option (i) and display option (ii) until the bar coded coupon has been read at the POS station 70 and coupon redemption has successfully occurred.

In an alternative embodiment, the coupon management program stored and running on the mobile communication device could be used as a mobile checkout device in a retail environment. The consumer carrying the mobile device would digitally image the bar code symbol on each product to be purchased before putting the item put into the cart. Then, the coupon management program, communicating with product price servers deployed in the retail environment, and operably connected to the digital network to which the mobile device is connected, will then display a running total cost of the items on its LCD screen, less the discount for each redeemable coupon managed by the program for the retail store. This will help the consumer ascertain the total cost of items in the shopping cart, less coupon discounts, at each stage of the retail shopping experience, prior to checkout at a retail POS station in the store environment. When the consumer arrives at the POS station, with a shopping cart of digitally scanned, the consumer can checkout and purchase the items by transmitting PCM light signal for each item in the cart, to the photo-detector at the POS station, associated with a bar code scanner adapted to receive and process such optically encoded signals. This coupon redemption and checkout method will have many advantages in retail environments seeking to expedite the checkout process with increased levels of throughout.

The illustrative embodiments described above have featured system and methods for imaging 1D bar code symbols and generating light signals pulse-code modulated (PCM) with the information from the 1D bar code symbol image. However, it is understood that such methods can be adapted for use with 2D bar code symbols as well as 1D bar code symbols.

One such alternative method would involve an improved method for transmitting information encoded within 1D and 2D bar code symbols to a laser scanning bar code symbol reader, using pulse-code modulated (PCM) based code signals. In a preferred embodiment, this method would involve the following steps:

(i) digitally imaging a 1D or 2D bar code symbol, and producing a digital image;

(ii) decoding the 1D or 2D bar code symbol and producing symbol character data representative of the read 1D or 2D bar code symbol;

(iii) storing the digital image of said 1D or 2D bar code symbol, together with said symbol character data;

(iv) encoding the combined data into encoded data;

(v) converting the encoded data to a PCM format; and (vi) generating and displaying a PCM code signal from a light emitting display surface of a mobile communication device (e.g. mobile phone 10) for detection by a photo-detector within (i) laser scanning bar code symbol reader 100, without physically laser scanning a graphically-displayed bar code symbol, or (ii) a digital imaging bar code symbol reader 200 without digitally imaging a graphically-displayed bar code symbol.

This method will allow for the 2D representation of data into a 1D representation of data transfer, as well as the PCM emulation of 1D symbologies.

Modifications that Come to Mind

While the illustrative embodiments described above involves the use of mobile smart-phones and cell-phones having integrated digital cameras and light emitting screens, in combination with digital imaging bar code symbol readers and laser-scanning bar code symbol readers, it is understood that the systems and methods of the present disclosure can be implemented using mobile devices having other form factors, including hand-held tablet computers, Apple® iPad devices, Apple® iPod® device with an integrated digital camera, Motorola® DROID® phones, and the like.

In general, any type of information storage and display device (e.g. mobile information storage and display device, television system, computer system, information appliance, image projection system, etc.) can be used to generate signals that cause bar-coded coupons to be displayed on light emitting display surface 12. Also, it is understood that application 13 could be implemented on any operating system running on computing platform 11B.

During coupon redemption operations, 2D stacked bar code symbols can be displayed (i.e. presented) to laser scanning bar code symbol reader 100, as a sequence of 1D bar codes, each displayed as PCM red-wavelength pulses of light energy, so as to enable the entire 2D stacked bar code symbol to be scanned by the laser scanning bar.

Several modifications to the illustrative embodiments have been described above. It is understood, however, that various other modifications to the illustrative embodiment will readily occur to persons with ordinary skill in the art. All such modifications and variations are deemed to be within the scope of the accompanying Claims.

What is claimed is:

1. An information storage and display device comprising:
    a computing platform for running one or more computer applications;
    a light emitting display surface interfaced with said computing platform for displaying digital images including graphics, bar code symbols, and graphical patterns in response to at least one computer application running on said computing platform;
    wherein during the running of at least one said application, a bar-coded coupon including a bar code symbol is to be displayed on said light emitting display surface and read by a laser scanning bar code symbol reader, said application displaying said bar code symbol on said light emitting display surface in a pulse code modulation (PCM) format;
    wherein a substantial portion of the pixels on said light emitting display surface are energized and de-energized to emit red-wavelengths of light energy at a rate which temporally corresponds to the spatial frequency of the bars and spaces of said bar code symbol so that said laser scanning bar code symbol reading device can read said PCM formatted bar code symbol displayed from said light emitting display surface without the generation of a laser scanning beam from said laser scanning bar code symbol reader; and
    wherein said at least one application running on said computing platform allows said information storage and display device to capture a digital image of a bar-coded coupon including a bar code symbol present on the Internet or printed on a physical substrate, convert said digital image of the bar-coded coupon into a PCM formatted bar code symbol, and display a PCM formatted bar code symbol on said light emitting display surface in the form of pixels on said light emitting display surface energized and de-energized to emit red-wavelengths of light energy at a rate which temporally corresponds to the spatial frequency of the bars and spaces of said bar code symbol so that said laser scanning bar code symbol reading device can read said PCM formatted bar code symbol displayed from said light emitting display surface without the generation of a laser scanning beam from said laser scanning bar code symbol reader.

2. The information storage and display device of claim 1, comprising a digital camera for capturing digital images of objects including bar-coded coupons printed on physical substrates.

3. The information display device of claim 2, which further comprises an application for running on said computing platform, and capturing bar-coded coupons printed on substrates by capturing digital images thereof using said digital camera.

4. The information storage and display device of claim 1, comprising an audio transducer for producing sounds in response to operation of the applications;
    an audio microphone for converting sounds into corresponding electrical signals; and
    a wireless communication comprising electro-magnetic antennas for supporting wireless communication including transmission and reception of signals between the device and digital information networks and cellular communication.

5. The information and display device of claim 1, which further comprises a device selected from the group consisting of cell-phones, smart-phones, mobile information storage and display devices, television systems, image projectors, information appliances, and computer systems.

6. The information display device of claim 1, wherein said light emitting display surface is selected from the group consisting of liquid crystal display (LCD) technology, light emitting diode (LED) technology, organic light emitting diode (OLED) technology, plasma display technology, and digital light projection (DLP) technology.

7. A method of reading a code symbol displayed on a light emitting display surface associated with an information storage and display device, said method comprising:
    running an application on said information display device, allowing said information storage and display device to capture a digital image of a symbol-coded coupon including a code symbol present on the Internet or printed on a physical substrate;
    using said application to capture a digital image of said symbol-coded coupon including said code symbol;
    converting the digital image of said code symbol into a pulse code modulation (PCM) format for display from said light emitting display surface; and
    displaying said code symbol in said PCM format from said light emitting display surface, during which a substantial portion of the pixels on said light emitting display surface are energized and de-energized to emit red-wavelengths of light energy at a rate which temporally corresponds to the spatial frequency of the bars and spaces of said code symbol so that a laser scanning bar code symbol reading device can read said PCM formatted code symbol displayed from said display surface and produce symbol character data representative of said read code symbol.

8. The method of claim 7 wherein the step of displaying said code symbol comprises displaying a graphical image of said code symbol on at least portion of said light emitting display surface, at the same time said code symbol is displayed in said PCM format.

9. The method of claim 7, wherein said light emitting display surface is selected from the group consisting of liquid crystal display (LCD) technology, light emitting diode (LED) technology, organic light emitting diode (OLED) technology, plasma display technology, and digital light projection (DLP) technology.

10. The method of claim 7, wherein said information storage and display device is selected from the group consisting of cell-phones, smart-phones, mobile information storage and display devices, television systems, image projectors, information appliances, and computer systems.

11. The method of claim 7, wherein said code symbols are code symbols selected from the group consisting of 1D bar code symbols, and 2D stacked bar code symbols.

12. A device comprising:
    a computing platform for running an application;
    a display connected to the computing platform for emitting light;
    wherein, when the computing platform runs the application, the computing platform converts a barcode symbol to a pulse code modulation (PCM) formatted barcode symbol and the display emits light pulses corresponding to the PCM formatted barcode symbol, wherein, when the computing platform runs the application, the light pulses emitted by the display are red wavelength light pulses.

13. The device of claim 12, wherein, when the computing platform runs the application, the display emits light pulses at a rate which temporally corresponds to the spatial frequency of the barcode symbol's bars and spaces.

14. The device of claim 12, wherein the display displays an image of the barcode symbol at the same time that the display emits lights pulses corresponding to the PCM formatted barcode symbol.

15. The device of claim 12, wherein the computing platform runs an application that captures an image of the barcode symbol from the internet.

16. The device of claim 12, wherein the device is a smartphone.

17. The device of claim 12, wherein the display comprises a liquid crystal display.

18. The device of claim 12, comprising a camera for capturing a digital image of the barcode symbol.

19. The device of claim 12, comprising a wireless communication module for supporting communication over networks.

* * * * *